United States Patent Office 3,635,923
Patented Jan. 18, 1972

3,635,923
PROCESS FOR ADDING SULFITE ESTERS TO ORGANO-ALKALI METAL CATALYZED POLYMERIZATION SYSTEMS
Charles M. Selman, Bartlesville, Okla., assignor to Phillips Petroleum Company
No Drawing. Filed Dec. 5, 1969, Ser. No. 882,705
Int. Cl. C08f 1/28, 7/04, 15/04
U.S. Cl. 260—84.3
9 Claims

ABSTRACT OF THE DISCLOSURE

The molecular weight and molecular weight distribution of homopolymers and copolymers of conjugated dienes and/or monovinyl-substituted aromatic hydrocarbons is increased and the cold flow of rubbery polymers of said monomers is decreased by employment of sulfite ester treating agents.

---

This invention relates to a process for improving homopolymers and copolymers prepared from conjugated dienes and homopolymers and copolymers of monovinyl-substituted aromatic hydrocarbon monomers. This invention relates to a process for providing homopolymers and copolymers of conjugated dienes and/or monovinyl-substituted aromatic hydrocarbons having a broadened molecular weight distribution, an increased Mooney viscosity and inherent viscosity. This invention further relates to a process for providing rubbery polymers of conjugated dienes exhibiting reduced cold flow properties. This invention further relates to a process for improving polymers by employing sulfite ester treating agents.

A process has now been discovered wherein sulfite ester treating agents are added to a polymerization system to provide Mooney viscosity, inherent viscosity, and molecular weight distribution increases in homopolymers and copolymers prepared from conjugated dienes and monovinyl-substituted aromatic hydrocarbons. It has been further discovered that the cold flow of rubbery polymers of conjugated dienes is decreased by employment of the sulfite ester treating agents.

According to my discovery, conjugated dienes and/or monovinyl-substituted aromatic hydrocarbons are polymerized with organoalkali metal initiators wherein sulfite ester treating agents are admixed to the polymerization system at any time prior to the complete deactivation of the organoalkali metal initiator and/or the polymer-alkali metal end groups.

It is an object of this invention to provide improved polymers of conjugated dienes and monovinyl-substituted aromatic hydrocarbons. It is a further object of this invention to provide a process for broadening the molecular weight distribution, increasing the Mooney viscosity and inherent viscosity of homopolymers and copolymers prepared from conjugated dienes and/or monovinyl-substituted aromatic hydrocarbons. It is another object of this invention to provide a process for reducing the cold flow of rubbery polymers of conjugated dienes.

Further objects and advantages of this invention will become apparent to those skilled in the art from the following description and discussion herein set forth.

According to the process of my invention, sulfite ester treating agents are charged to a polymerization system at any time prior to the complete deactivation of the organo-alkali metal initiator and/or the polymer-alkali metal end groups. Thus, according to one method of operation, a small quantity of sulfite ester treating agent can be added to the polymerization system initially or at some point less than at complete monomer conversion followed by another addition of a second portion of sulfite ester treating agent after essentially all of the monomer has been converted to polymer. According to another method of operation, the sulfite ester treating agent, or mixture of sulfite ester treating agents, is added to the polymerization system only after monomer conversion to polymer is essentially completed. It should be noted that the sulfite ester treating agent also functions as a polymerization terminating agent and when some sulfite ester treating agent is added initially the amount added should not be sufficient to completely destroy the polymerization initiator. It is also within the scope of this invention to employ auxiliary conventional terminating agents such as water or alcohols after the sulfite ester has been added and after essentially complete monomer conversion has been achieved.

The temperatures employed in the contacting of the sulfite ester treating agents and the polymerization system or reaction mixture and/or reaction product can be the same as employed for the polymerization reaction. It is to be understood however that the temperature employed for the reaction between the sulfite ester treating agent and the polymerization reaction mixture can be different from that employed for the polymerization reaction. However, the polymerization temperature can also be raised or lowered if desired after the sulfite ester treating agent has been added to the polymerization reaction.

The time employed for the sulfite ester treating agent contacting with the polymerization reaction mixture and/or reaction product is generally dependent upon the choice of the particular sulfite ester treating agent and the temperature. The time will generally be from about 1 minute to 48 hours. Longer times can of course be employed.

The sulfite ester treating agents which are employed according to my invention can be represented by the general formula

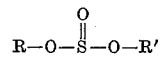

wherein R and R' are selected from the group consisting of alkyl, aryl, cycloalkyl, and combinations thereof, such as alkylaryl, aralkyl, alkylcycloalkyl, and the like, hydrocarbon radicals containing from 1 to 20 carbon atoms and also wherein R and R' taken together can be a divalent hydrocarbon radical so that the ester is a cyclic compound. It is to be understood that the above hydrocarbon radicals can be substituted with groups such as alkoxy groups, which do not react with or otherwise prevent the desired reaction between the alkali metal terminal atoms of the polymer and the sulfite ester treating agent. Examples of suitable esters of sulfurous acid representing the sulfite ester treating agents that can be employed according to this invention include the following exemplary compounds: dimethyl sulfite; diethyl sulfite; di-n-propyl sulfite; dieicosyl sulfite; dicyclopentyl sulfite; diphenyl sulfite; di-1-naphthyl sulfite; (4-methylcyclohexyl) (4-cyclohexylphenyl)sulfite; di-(4-phenyl-1-butyl)sulfite; (ethyl)(3,4,6-tri-n-propyl-8-methyl-1-naphthyl) sulfite; ethylene sulfite; 1,3-propylene sulfite; 1,5-pentylene sulfite; 3,7-dicyclopentyl-1,10-decylene sulfite; 4-ethoxy-1,2-phenylene sulfite; 9,10-anthracenyl sulfite; 1,8-diethyl-4,5-naphthalenyl sulfite; and the like. Mixtures of the above sulfite ester treating agents can of course be employed according to this invention.

The amount of the sulfite ester treating agent employed in this invention is generally within the range from about 0.01 to 1,000 millimoles of treating agent per 100 grams of monomer(s) (mhm.). Preferably from about 0.10 to 100 millimoles of sulfite ester treating agent per 100 grams of monomer(s) can be employed.

The monomers which can be employed to prepare the homopolymer or copolymer containing the reactive terminal alkali metal atoms include a wide variety of compounds polymerizable by organoalkali metal compounds. The preferred monomers include conjugated dienes containing from about 4 to 12, preferably 4 to 8, carbon atoms per molecule. Exemplary conjugated diene monomers include the following: 1,3-butadiene; isoprene; 1,3-pentadiene; 2,3-dimethyl - 1,3 - butadiene; 3-(1-butyl)-1,3-octadiene; 2 - phenyl - 1,3 - butadiene; and the like. Mixtures of conjugated dienes can also be employed.

Other preferred monomers which can be employed to form homopolymers or copolymers include monovinyl-substituted aromatic hydrocarbons containing from about 8 to 20, preferably from about 8 to 12, carbon atoms per molecule. Exemplary of these compounds include styrene; 2-vinylnaphthalene; 4-dodecyl styrene; 4-cyclohexyl styrene; 4-p-tolyl styrene; 8-phenyl-2-vinyl-naphthalene; and the like. Mixtures of monovinyl-substituted aromatic hydrocarbons can be employed. Mixtures of conjugated dienes and monovinyl-substituted aromatic hydrocarbons can be employed to form copolymers, both random and block. Said block copolymers can, for example, be prepared by the sequential addition and polymerization of two or more different monomers.

The polymerization of the aforegoing monomers can be carried out in the presence or absence of a solvent mixture. Polymerization is preferably carried out in the presence of a solvent mixture or diluent comprising a hydrocarbon selected from aromatics, paraffins, cycloparaffins, and the like. A hydrocarbon diluent containing from about 3 to 12 carbon atoms per molecule is preferred. Mixtures of two or more diluents can be employed. Examples of suitable hydrocarbons which can be used as diluent material include propane, isobutane, n-pentane, isooctane, n-dodecane, cyclopentane, cyclohexane, methylcyclopentane, ethylcyclopentane, dimethylcyclopentane, ethylcyclohexane, benzene, toluene, xylene, ethylbenzene, naphthalene, and the like.

The polymerization can also be carried out in the presence of mixtures of the aforesaid hydrocarbon solvents with admixtures of polar compounds which do not inactivate the organoalkali metal initiators. Small amounts of polar compounds such as between 0.005 to 50 weight percent of the total solvent mixture can be employed such as to promote the formation of random copolymers. Compounds such as ethers, thioethers and tertiary amines can be suitably employed. Exemplary are dimethyl ether, diethyl ether, ethylmethyl ether, ethylpropyl ether, di-n-propyl ether, di-n-octyl ether, dibenzyl ether, diphenyl ether, anisole, tetramethylene oxide, 1,2 - dimethoxyethane, dioxane, dimethyl sulfide, paraldehyde, diethyl sulfide, di-n-propyl sulfide, trimethylamine, triethylamine, pyridine, tetrahydrofuran, and the like.

The use of polar solvents as randomizing agents in the preparation of random copolymers of dienes with monovinyl-substituted aromatic hydrocarbons is disclosed in U.S. Pat. 2,975,160 issued to Zelinski, Mar. 4, 1961, and is herein incorporated by reference thereto. Other randomizing agents such as potassium tert-butoxide and hexamethylphosphoramide can also be employed.

According to this invention any conventional organoalkali-metal initiator that can polymerize the monomeric materials hereinbefore described can be employed. Organoalkali initiators represented by the formula $R''M_x$ wherein R'' is a hydrocarbon radical containing from about 1 to about 40 carbon atoms, M is an alkali metal, and $x$ is an integer from 1 to 4 are known to be excellent organoalkali-metal polymerization initiators that can be preferably employed according to this invention. Hydrocarbyllithium initiators are the preferred alkali metal polymerization initiators. Examples of suitable organoalkali metal compounds include methyllithium; n-butyllithium; sec-butyllithium; tert-butyllithium; cyclopentyllithium; phenyllithium; 1 - naphthyllithium; 1,4-dilithiobutane; 1,4 - dilithio-2-methyl-2-butene; 4 - butylphenyl sodium; 4 - phenylbutylcesium; 4 - cyclohexylbutyl potassium; eicosyllithium; 1,5,10,15 - tetralithiotriacontane; and the like.

Multifunctional polymerization initiators such as prepared from the reaction between organomonolithium compounds with polyvinyl phosphine compounds, polyvinyl silane compounds, and the like, such as disclosed in U.S. patent application Ser. No. 795,364, filed Jan. 30, 1969, now allowed, by Ralph C. Farrar can be suitably employed. Other novel multifunctional initiators such as disclosed in U.S. patent application Ser. No. 795,365, by Floyd E. Naylor filed Jan. 30, 1969, now allowed and U.S. patent application Ser. No. 793,910, filed Jan. 24, 1969, by Ralph C. Farrar, are also exemplary and can be suitably employed.

The amount of polymerization initiator employed is generally in the range from about 0.1 to 100, preferably 0.5 to 25, gram millimoles of organoalkali metal initiator per 100 grams of monomers that are employed.

The temperature employed for the polymerization can vary but generally is within the range from about $-100$ to $150°$ C., preferably from about $-75$ to $75°$ C. The pressures employed are preferably at least sufficient to maintain the monomeric materials predominantly in the liquid phase. The time employed for the polymerization reaction is generally dependent on the choice of monomers, initiator, and temperature. The time will generally range from about 0.5 to 48 hours.

The polymeric products produced according to this invention can be employed in multifarious applications depending primarily on their particular molecular weight and composition. Lower molecular weight products can be employed as sealants, adhesives, caulking compounds, potting compounds, and the like. Higher molecular weight products can be compounded and cured with conventional fillers, plasticizers, tackifiers, extender oils, curatives, pigments, antioxidants, and the like, and can be employed in the production of articles such as tires, belting, shoe soles, and the like. Low cold flow and improved processing characteristics are notable features of the rubbery polymers produced according to this invention. Increased Mooney viscosity, inherent viscosity, and broadened molecular weight distribution are notable features of the polymeric products produced according to this invention.

Illustrative of the foregoing discussion and not to be interpreted as a limitation on the scope thereof or on the ingredients therein employed the following examples are presented.

EXAMPLE I

Runs were conducted in which ethylene sulfite was employed as the treating agent and it was admixed with the polymerization mixture containing the polybutadiene prepared with an organolithium initiator according to the following polymerization recipe:

Polymerization recipe

|  | Parts by wt. |
|---|---|
| Cyclohexane | 975 |
| 1,3-butadiene | 100 |
| Organolithium initiator, mhm.[1] | Variable |
| Tetrahydrofuran (THF) | Variable |
| Temperature, ° C. | 70 |
| Time, hrs. | 1 |
| Treating agent—ethylene sulfite | Variable |
| Temperature, ° C. | 70 |
| Time, hours | Variable |

[1] Mhm.—gram millimoles per 100 grams of monomer(s).

In these runs cyclohexane was charged to the reactor first followed by a nitrogen purge. Butadiene monomer was added followed by the organoalkalimetal initiator. Tetrahydrofuran, if employed, was then added. The ethylene sulfite treating agent was added at the end of the 1 hour polymerization period (after essentially complete monomer conversion) and the mixture agitated for an additional period at the polymerization temperature. Each reaction mixture was then charged with a 10 weight percent solution of 2,2'-methylene-bis(4-methyl-6-tert-butylphenol), an antioxidant, in a 50/50 by volume mixture of isopropyl alcohol and toluene with the amount added being sufficient to provide about 1 part by weight of the antioxidant per 100 parts by weights of the polymer. Each reaction mixture was coagulated in isopropyl alcohol and the polymer separated and dried. The results are recorded in Table I.

TABLE I

| Run No. | Ethylene sulfite Mhm. | Time, hrs. | Organolithium initiator | Mhm. | THF, phm. | I.V.[a] | ML-4, Mooney[b] | Cold flow, mg./min.[c] | Hetero Index[d] (HI) |
|---|---|---|---|---|---|---|---|---|---|
| 1 | 0 | | Sec-BuLi | 1.0 | 0 | 1.80 | 18 | 35.6 | 1.19 |
| 2 | 0.25 | .5 | do | 1.0 | 0 | 2.45 | 65 | 0 | 1.63 |
| 3 | 0.37 | .5 | do | 1.0 | 0 | 3.41 | 130 | 0 | 1.58 |
| 4 | 0.72 | .5 | do | 1.0 | 0 | 2.37 | 56 | 2.7 | 1.42 |
| 5 | 2.0 | .5 | do | 1.0 | 0 | 2.24 | 52 | 3.8 | |
| 6 | 0 | | do | 0.9 | 1.5 | 1.84 | 25 | 26 | 1.21 |
| 7 | 0.33 | .5 | do | 0.9 | 1.5 | 2.78 | 92 | 0.3 | 1.59 |
| 8 | 0 | | do | 1.0 | 1.5 | 1.64 | 11 | 65.6 | |
| 9 | 0.37 | .5 | do | 1.0 | 1.5 | 2.51 | 61 | 0.7 | |
| 10 | 0 | | n-BuLi | 1.0 | 0 | 1.57 | 11 | 56.4 | 1.17 |
| 11 | 0.24 | .5 | do | 1.0 | 0 | 2.29 | 55 | 0.6 | 1.66 |
| 12 | 0.35 | .5 | do | 1.0 | 0 | 2.39 | 60 | 0.6 | 1.63 |
| 13 | 1.4 | .5 | do | 1.0 | 0 | 2.27 | 56 | 4.9 | 1.41 |
| 14 | 4.1 | .5 | Sec-BuLi | 1.0 | 0 | 2.60 | 87 | 2.0 | 1.44 |
| 15 | 4.1 | 2.0 | do | 1.0 | 0 | 2.59 | 89 | 1.7 | 1.48 |
| 16 | 21.0 | .5 | do | 1.0 | 0 | 2.58 | 87 | 2.1 | 1.45 |
| 17 | 21.0 | 2.0 | do | 1.0 | 0 | 2.59 | 95 | 1.4 | 1.47 |
| 18 | 41.0 | .5 | do | 1.0 | 0 | 2.88 | 113 | 0.9 | 1.51 |
| 19 | 41.0 | 2.0 | do | 1.0 | 0 | 2.86 | 115 | 1.4 | 1.47 |
| 20 | 62.0 | 0.5 | do | 1.0 | 0 | 2.70 | 99 | 2.0 | 1.48 |
| 21 | 62.0 | 2.0 | do | 1.0 | 0 | 2.69 | 98 | 2.0 | 1.44 |

[a] Determined according to procedure of U.S. Pat. 3,278,508 col. 29, notes a and b, all polymers gel free.
[b] ML-4 @ 212° F. ASTM D 1646-63.
[c] Measured by extruding the sample through a ¼-inch orifice at 3.5 p.s.i. pressure at 50° C. After allowing 10 minutes to reach steady state, the rate of extrusion is measured in mg./min.
[d] H.I.=Heterogeneity Index, the ratio of the weight average molecular weight ($M_w$) to the number average molecular weight ($M_n$) as determined by gel permeation chromatography (GPC) employing a Waters Model 100 Gel Permeation Chromatograph.

The data reported in Table I demonstrate that a large reduction in cold flow and a large increase in Mooney viscosity, inherent viscosity and broadened molecular weight distribution is achieved by the process of my invention.

EXAMPLE II

Other runs were conducted employing the polymerization recipe of Example I. Control runs were also conducted in which reagents were used to react with the polymerization mixture prior to the addition of the ethylene sulfite. In all of the runs sec-butyllithium, 1.0 mhm., was employed as the polymerization initiator. Tetrahydrofuran was not employed in these runs. Ethylene sulfite was added in the order indicated in Table II. The ethylene sulfite was allowed to react with the polymerization reaction mixture for 0.5 hour at 70° C. Polybutadiene polymers from each run were recovered in the manner employed in Example I.

TABLE II

| Run No. | Ethylene sulfite mhm. | Inherent viscosity | Mooney ML-4 at @ 212° F. | Cold flow, mg./min. |
|---|---|---|---|---|
| 1 | 0 | 1.64 | 16 | 27.9 |
| 2 | 0.37 | 1.95 | 37 | 3.1 |
| 3[a] | 0.37 | 1.43 | 10 | 52.4 |
| 4[b] | 0.37 | 1.61 | 15 | 40.4 |

[a] Reacted with 0.5 part by weight of ethylene oxide prior to addition of the ethylene sulfite.
[b] Reacted with 0.5 part by weight methyl alcohol prior to addition of the ethylene sulfite.

The results reported in Table II demonstrate that the desired objects of this invention are achieved by the addition of the sulfite ester treating agent to the polymerization mixtures which have not been terminated or otherwise treated so as to transform or destroy the carbonalkali metal end groups on the prepared polymer.

EXAMPLE III

Runs were conducted employing the polymerization recipe of Example I with the exception that a multilithium initiator (2.25 mhm.) was employed. Tetrahydrofuran was not employed. A 2-hour polymerization time was provided. A multifunctional lithium initiator was prepared by reacting divinylbenzene with sec-butyllithium at a 0.25/1 mole ratio of the respective reactants. The results of these runs are reported in Table III.

TABLE III

| Run No. | Ethylene sulfite, mhm. | Inherent viscosity[a] | Mooney[b] ML-4 at 212° F. | Cold flow mg./min.[a] | H.I.[a] |
|---|---|---|---|---|---|
| 1 | 0 | 1.12 | 2 | (b) | 1.13 |
| 2 | 0.62 | 2.04 | 44 | 0.03 | 2.60 |
| 3 | 0.92 | 2.03 | 44 | 0.04 | 2.40 |
| 4 | 3.73 | 1.80 | 29 | 4.10 | 1.83 |

[a] As reported in Table I footnotes.
[b] Too high to measure.

The above data demonstrate that the multifunctional, i.e., multilithium initiators, can also be employed according to this invention and that the desired changes in cold flow, Mooney viscosity, inherent viscosity and in heterogenity index are achieved.

EXAMPLE IV

Styrene/butadiene block copolymers were prepared and reacted with a sulfite ester treating agent according to this invention. The following polymerization recipe was employed.

Polymerization recipe

Step 1 (styrene polymerization): Parts by wt.
   Cyclohexane _____ 975
   Styrene _____ 40
   sec-Butyllithium (mhm.) _____ 3.0
   Temperature, ° C. _____ 70
   Time, hours _____ 0.5
Step 2 (butadiene polymerization):
   1,3-butadiene _____ 60
   Temperature, ° C. _____ 70
   Time, hours _____ 1
Step 3 (sulfite ester treating):
   Ethylene sulfite (mhm.) _____ Variable
   Temperature, ° C. _____ 70
   Time, hours _____ 0.5

The results representing these runs are reported in Table IV.

TABLE IV

| Run No. | Ethylene sulfite, mhm. | Inherent viscosity [b] | H.I.[b] | Green tensile,[a] p.s.i. |
|---|---|---|---|---|
| 1 | 0 | 0.54 | 1.24 | (c) |
| 2 | 0.9 | 0.77 | 1.80 | 3,750 |
| 3 | 2.9 | 0.79 | 1.54 | 3,950 |
| 4 | 5.5 | 0.77 | 1.63 | 4,100 |

[a] ASTM D 412-66 measured on uncured specimens.
[b] As reported in footnotes of Table I.
[c] Too low to measure.

The above results demonstrate that ethylene sulfite treating agent employed according to this invention results in a significant increase in green tensile strength of a styrene/butadiene block copolymer and is indicative of the presence of at least two polystyrene segments in said polymer. Increases in inherent viscosity and heterogenity index in the polymers made according to this invention are also demonstrated in the results of Table IV.

EXAMPLE V

Other runs were conducted in which random or block copolymers of styrene/butadiene were reacted with ethylene sulfite according to this invention. The following polymerization recipe was employed.

Polymerization recipe

| | Parts by wt. |
|---|---|
| Cyclohexane | 780 |
| 1,3-butadiene | 75 |
| Styrene | 25 |
| n-Butyllithium, mhm. | 1.0 |
| Tetrahydrofuran (THF) | Variable |
| Temperature, °C. | 70 |
| Time, hours | 1 |
| Treating agent, ethylene sulfite, mhm. | Variable |
| Temperature, °C. | 70 |
| Time, hours | 0.75 |

The results representing these runs are reported in Table V.

TABLE V

| Run No. | Ethylene sulfite Mhm. | Ethylene sulfite Time, hrs. | THF,[b] phm. | I.V.[a] | ML-4, Mooney [a] | H.I.[a] |
|---|---|---|---|---|---|---|
| 1 | 0 | | 0 | 1.60 | | 1.18 |
| 2 | 0.2 | 0.75 | 0 | 2.09 | | 1.45 |
| 3 | 0 | | [c]1.5 | 1.59 | 44 | 1.27 |
| 4 | 1.0 | 0.75 | [c]1.5 | 2.05 | 90 | 1.52 |

[a] As determined in Table I footnotes.
[b] Parts by weight per 100 parts by weight monomer.
[c] Random copolymer.

The foregoing data represented in Table V demonstrate the increases in inherent viscosity, Mooney viscosity, and heterogenity index in random or block copolymers made according to this invention.

EXAMPLE VI

Polybutadiene polymer was prepared according to this invention and evaluated in a tire tread stock vulcanization recipe. The polymerization and compounding recipes are reported below and the polymer properties reported in Table VI.

Polymerization recipe

| | Parts, by wt. |
|---|---|
| Cyclohexane | 980 |
| 1,3-butadiene | 100 |
| n-Butyllithium (mhm.) | 1.2 |
| Temperature, °C. | 70 |
| Time, hours | 1 |
| Ethylene sulfite (mhm.) | 0.39 |
| Temperature, °C. | 70 |
| Time, hours | 0.5 |

The charging procedure and the polymer isolation procedures were the same as those employed in Example I.

Compounding recipe

| | Parts, by wt. |
|---|---|
| Polybutadiene | 100 |
| Carbon black (IRB No. 2 blend) | 50 |
| Zinc oxide | 3 |
| Stearic acid | 2 |
| Shell Dutrex 726 [1] | 10 |
| Sulfur | 1.75 |
| Santocure NS [2] | 0.8 |

[1] Petroleum oil fraction; gravity, °API 11.5; viscosity, S.U.S. at 210° F., 83; distillation range, °F. initial, 672°, 90%, 861°.
[2] N-tert-butyl-2-benzothiazolesulfenamide.

TABLE VI

Raw properties

| | |
|---|---|
| Mooney viscosity (ML-4 at 212° F.) | 53 |
| Cold flow, mg./min. | 0.03 |
| Inherent viscosity, dl./g. | 2.32 |
| Heterogeneity index | 1.63 |
| Mooney viscosity (compounded)(ML-4 at 212° F.) | 75 |

Cured 35 minutes at 293° F.

| | |
|---|---|
| 300% modulus,[1] p.s.i. | 1265 |
| Tensile,[1] p.s.i. | 2465 |
| Elongation,[1] percent | 440 |
| Heat build-up,[2] ΔT °F. | 62.2 |
| Resilience,[3] percent | 69.9 |
| Compression set,[4] percent | 28.2 |
| Shore A hardness [5] | 62 |

[1] ASTM D 412-66.
[2] ASTM D 623-62.
[3] ASTM D 945-59.
[4] ASTM D 395-61.
[5] ASTM D 1706-61.

The above results demonstrate that a vulcanized polybutadiene with an excellent balance of physical properties can be prepared according to this invention.

As will be evident to those skilled in the art, various modifications of this invention can be made or followed in light of the disclosure and discussion herein set forth without departing from the scope or the spirit thereof.

I claim:

1. In a process for preparing homopolymers and copolymers from conjugated dienes and/or monovinyl-substituted aromatic hydrocarbons employing organoalkali-metal initiators the improvement comprising admixing to the polymerization reaction mixture and/or reaction product prior to deactivation of the organoalkali-metal initiator a sulfite ester treating agent represented by the following formula

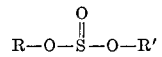

wherein each of R and R' is a hydrocarbyl radical containing from 1 to 20 carbon atoms and is alkyl, aryl, cycloalkyl, or combination thereof, and R and R' taken together can be a divalent hydrocarbon radical so that the sulfite ester is a cyclic compound; and wherein said sulfite ester treating agent is employed in an amount to provide from about 0.01 to 1,000 millimoles of said sulfite ester per 100 grams of monomer employed in preparing the polymer.

2. The process of claim 1 wherein said sulfite ester treating agent is employed in an amount to provide from about 0.10 to 100 millimoles of sulfite ester per 100 grams of monomer, said polymers are polymers of conjugated dienes containing from 4 to 12 carbon atoms per molecule, monovinyl-substituted aromatic hydrocarbons containing from 8 to 20 carbon atoms per molecule, or mixtures of any two or more thereof.

3. The process of claim 2 wherein said sulfite ester treating agent is admixed to the polymerization reaction mixture and/or reaction product at a point in time less than that required for complete monomer conversion in an amount insufficient to completely destroy said organoalkali metal polymerization initiator and wherein a second portion of said sulfite ester treating agent is admixed after essentially complete monomer conversion has been achieved.

4. The process according to claim 2 wherein said sulfite ester treating agent is added to said polymerization reaction mixture and/or reaction product after the polymerization has essentially been completed, and wherein from about 1 minute to 48 hours contacting time is provided after the addition of said sulfite ester treating agent.

5. The process of claim 2 wherein said organoalkali-metal polymerization initiator is an organolithium polymerization initiator and wherein said conjugated diene is butadiene and said monovinyl-substituted aromatic hydrocarbon is styrene.

6. The process according to claim 2 wherein the polymer prepared consists essentially of a homopolymer of butadiene, wherein said organoalkali-metal polymerization initiator is sec-butyllithium, wherein said sulfite ester treating agent is ethylene sulfite, wherein said polymerization reaction is conducted at a temperature within the range from about −100 to 150° C., wherein the polymerization time is in the range from about 0.5 to 48 hours, and wherein said sec-butyllithium is employed in an amount to provide from about 0.1 to 100 gram millimoles per 100 grams of monomer.

7. The process according to claim 2 wherein the prepared polymer consists essentially of a butadiene/styrene copolymer, wherein said organoalkali-metal polymerization initiator is sec-butyllithium or n-butyllithium, wherein said sulfite ester treating agent is ethylene sulfite.

8. The process according to claim 2 wherein the prepared polymer consists essentially of a homopolymer of styrene, wherein said organoalkali-metal polymerization initiator is sec-butyllithium or n-butyllithium and wherein said sulfite treating agent is ethylene sulfite.

9. The polymeric product produced according to the process of claim 1.

References Cited

UNITED STATES PATENTS

| | | | |
|---|---|---|---|
| 2,543,636 | 2/1951 | Loritsch | 260—94.4 |
| 3,135,716 | 6/1964 | Uranerk et al. | 260—94.7 |
| 3,328,363 | 6/1967 | Blumel et al. | 260—94.7 |
| 3,471,431 | 10/1969 | Mann et al. | 260—94.7 |

JAMES A. SEIDLECK, Primary Examiner

U.S. Cl. X.R.

260—93.5 S, 94.4, 94.7 S